US008342793B2

(12) United States Patent
Way et al.

(10) Patent No.: US 8,342,793 B2

(45) Date of Patent: Jan. 1, 2013

(54) ACTIVE SURGE CONTROL

(75) Inventors: Donald L. Way, Phoenix, AZ (US); Joel Lantz, Bedford Heights, OH (US)

(73) Assignee: Cleveland Electric Laboratories, Twinsburg, OH (US)

( * ) Notice: Subject to any disclaimer, the term of this patent is extended or adjusted under 35 U.S.C. 154(b) by 1113 days.

(21) Appl. No.: 12/196,845

(22) Filed: Aug. 22, 2008

(65) Prior Publication Data

US 2009/0055071 A1 Feb. 26, 2009

Related U.S. Application Data

(60) Provisional application No. 60/957,287, filed on Aug. 22, 2007, provisional application No. 60/983,330, filed on Oct. 29, 2007.

(51) Int. Cl.
*F04D 27/02* (2006.01)

(52) U.S. Cl. .......................................... 415/1; 415/17

(58) Field of Classification Search ..................... None
See application file for complete search history.

(56) References Cited

U.S. PATENT DOCUMENTS

| | | | | |
|---|---|---|---|---|
| 4,545,198 | A * | 10/1985 | Yoshida | 60/39.25 |
| 6,506,010 | B1 * | 1/2003 | Yeung et al. | 415/1 |
| 7,187,161 | B2 * | 3/2007 | Wright | 324/102 |
| 7,464,533 | B2 * | 12/2008 | Wollenweber | 60/39.15 |
| 2007/0234730 | A1 * | 10/2007 | Markham et al. | 60/772 |
| 2008/0178909 | A1 * | 7/2008 | Alvestig et al. | 134/18 |

* cited by examiner

*Primary Examiner* — Nicole Verley

(74) *Attorney, Agent, or Firm* — Roger Emerson; Emerson Thomson Bennett

(57) ABSTRACT

The present invention generally relates to a system for preventing surges in turbine engines and/or rotating compressors. Furthermore, some embodiments comprise sensors for monitoring engine operating characteristics and detecting surge and pre-surge conditions. Some embodiments also include means for adjusting engine operation in response to sensor data. Still other embodiments relate to methods of preventing surges in turbine engines and/or rotating compressors.

18 Claims, 14 Drawing Sheets

ACTIVE SURGE CONTROL

I. CROSS REFERENCE TO RELATED APPLICATIONS

This application claims priority to Provisional Application Ser. No. 60/957,287 filed Aug. 22, 2007, which is incorporated herein by reference in its entirety. This application also claims priority to Provisional Application Ser. No. 60/983,330 filed Oct. 29, 2007 now pending, which is incorporated herein by reference in its entirety.

II. BACKGROUND OF THE INVENTION

A. Field of Invention

This invention pertains to the art of methods and apparatuses regarding the manufacture and control of turbine engines, and more particularly to methods and apparatuses regarding the active surge control of turbine engines.

B. Description of the Related Art

Turbine engines of all types compress the combustion air in the first part of the working cycle. High compression of the inlet air results in optimal engine efficiency. However, too much compression at a given air flow causes instability and surging, a reversal in the direction of gas flow toward the inlet of the turbine engine, occurs. Surging may result in hot gas flow, or flames, discharging out of the inlet of the turbine engine. Surging may also damage multiple parts of an engine. Therefore, turbine engine control systems normally maintain working compression ratios that are conservatively lower than surge compression ratios by a safety margin that has been established for the particular engine. Therefore, normal working compression ratios are not optimally efficient. What is needed then is a way to provide active surge control of a turbine engine while maintaining a working compression ratio that is optimally efficient.

III. SUMMARY OF THE INVENTION

According to one embodiment, a device uses high-speed inlet-temperature feedback to detect the very rapid temperature spikes that occur at the turbine-engine air inlet before an actual surge occurs. In response to these pre-surge temperature spikes, the device may automatically trim compression ratios to just below the surge line, thereby maintaining optimal compression ratios and optimal engine efficiency.

According to another embodiment, a device detects pre-surge temperature spikes with an array of temperature sensing elements. The array of temperature sensing elements may be fiber-optic sensing elements, all multiplexed on a single fiber and monitored via a single interrogation instrument. Also, several single sensing elements, or sensing element groups, on multiple fibers may be multiplexed.

According to another embodiment, a device detects pre-surge temperature spikes with an array of temperature sensing elements. The array of temperature sensing elements may be encased in a single, fine-gauge metallic or nonmetallic tube, such as a 0.016" or 0.020" OD tube of stainless steel, polyimide, PEEK, or fluoropolymer, shaped to fit around the periphery of the turbine-engine inlet.

According to another embodiment, a device detects pre-surge temperature spikes with an array of temperature sensing elements. The array of temperature sensing elements may respond the temperature spikes within milliseconds, or some other relatively quick time period. The containment tube may be helium-filled for optimum thermal response.

According to another embodiment, a device detects pre-surge temperature spikes with an array of temperature sensing elements. The array of temperature sensing elements may be fiber-optic sensing elements. The fiber-optic sensing elements may be EMI-immune and therefore can monitor temperatures remotely with negligible signal degradation and no need for response-slowing signal filtering at the interrogation instrument. Additionally, the fiber-optic sensing elements may be highly resistant to vibratory degradation.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
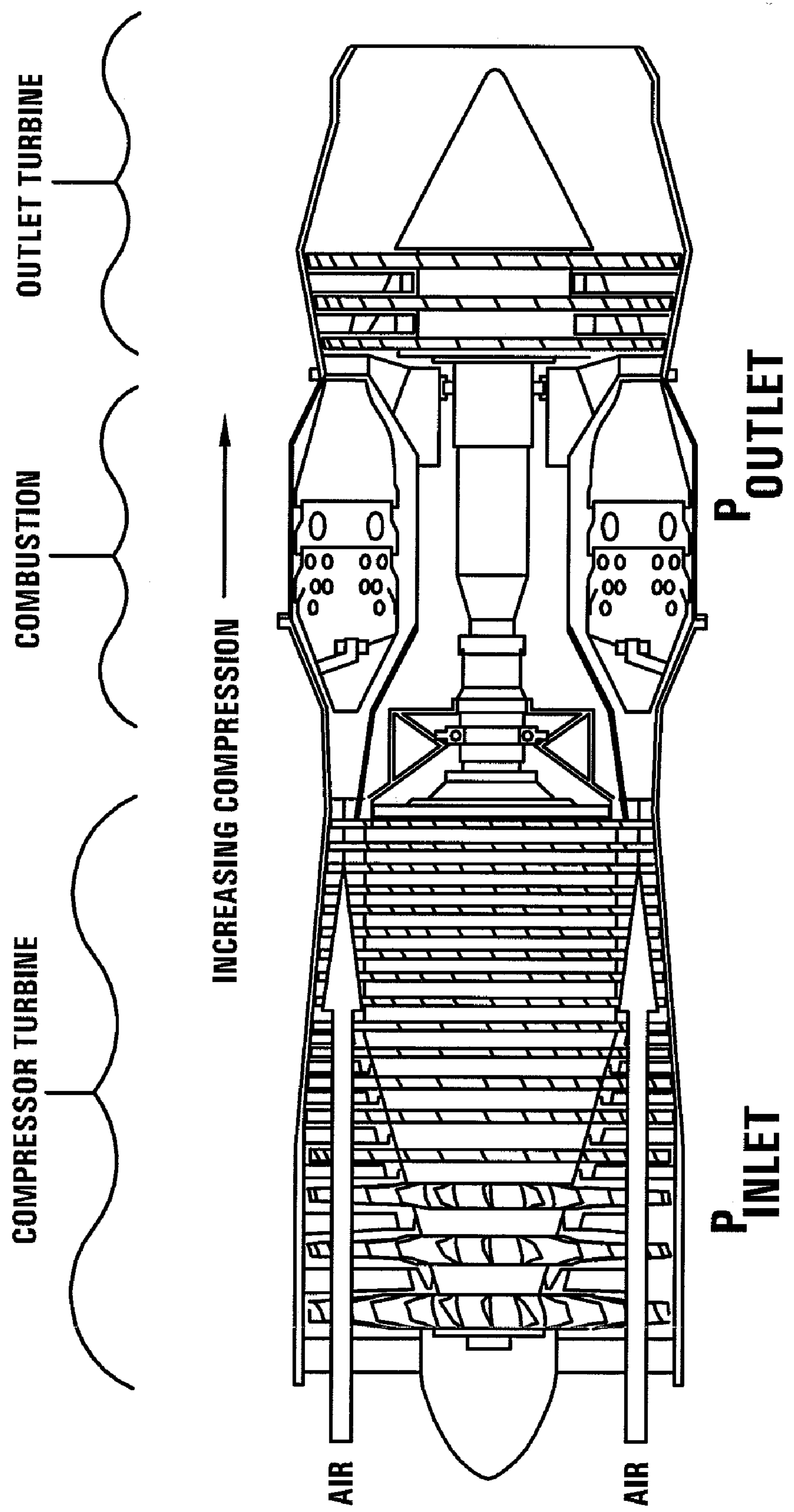
FIG. 1 shows the compressor of an axial-flow turbojet engine.
Figure 2:
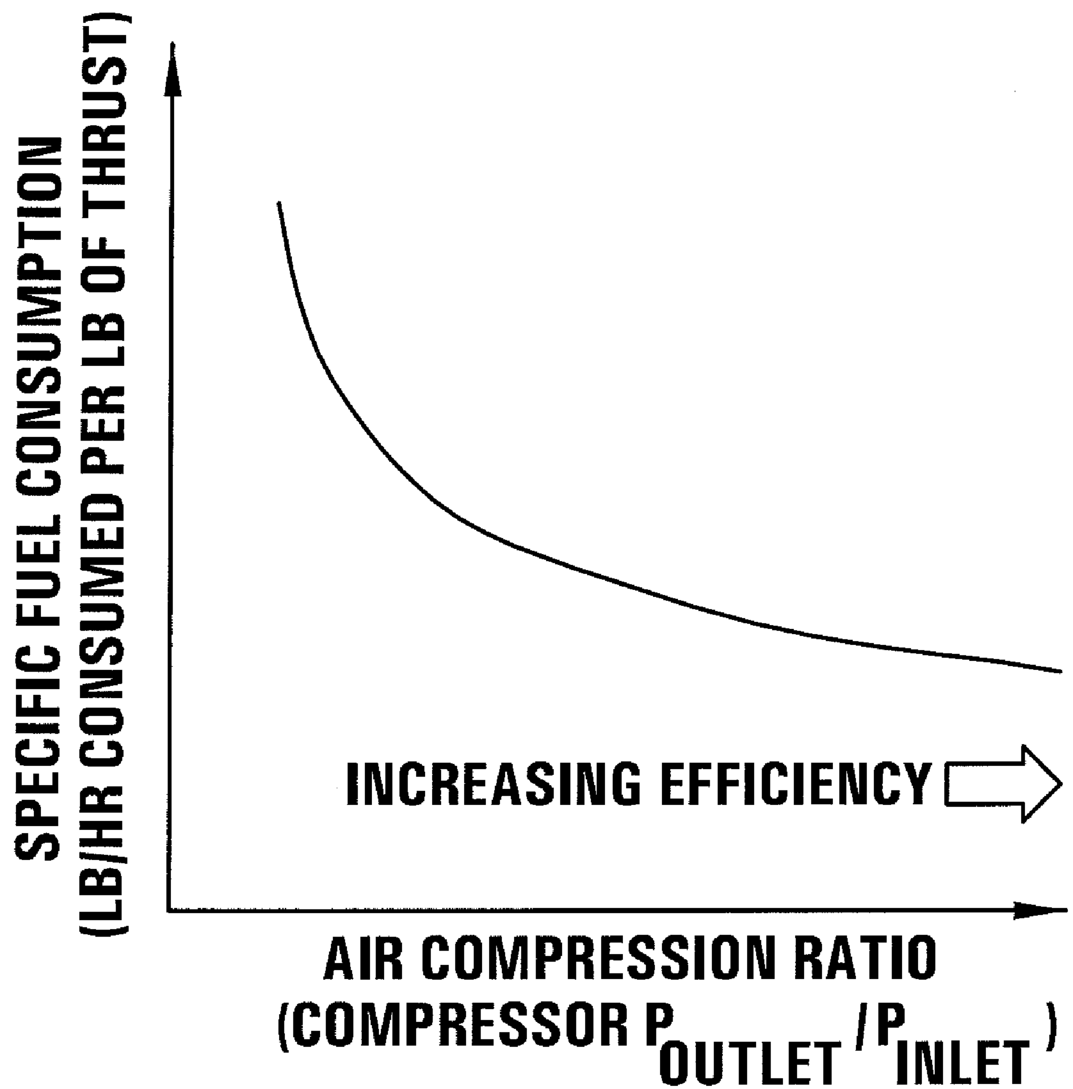
FIG. 2 shows a graph depicting the relationship between fuel consumption and air compression ratios.
Figure 3:
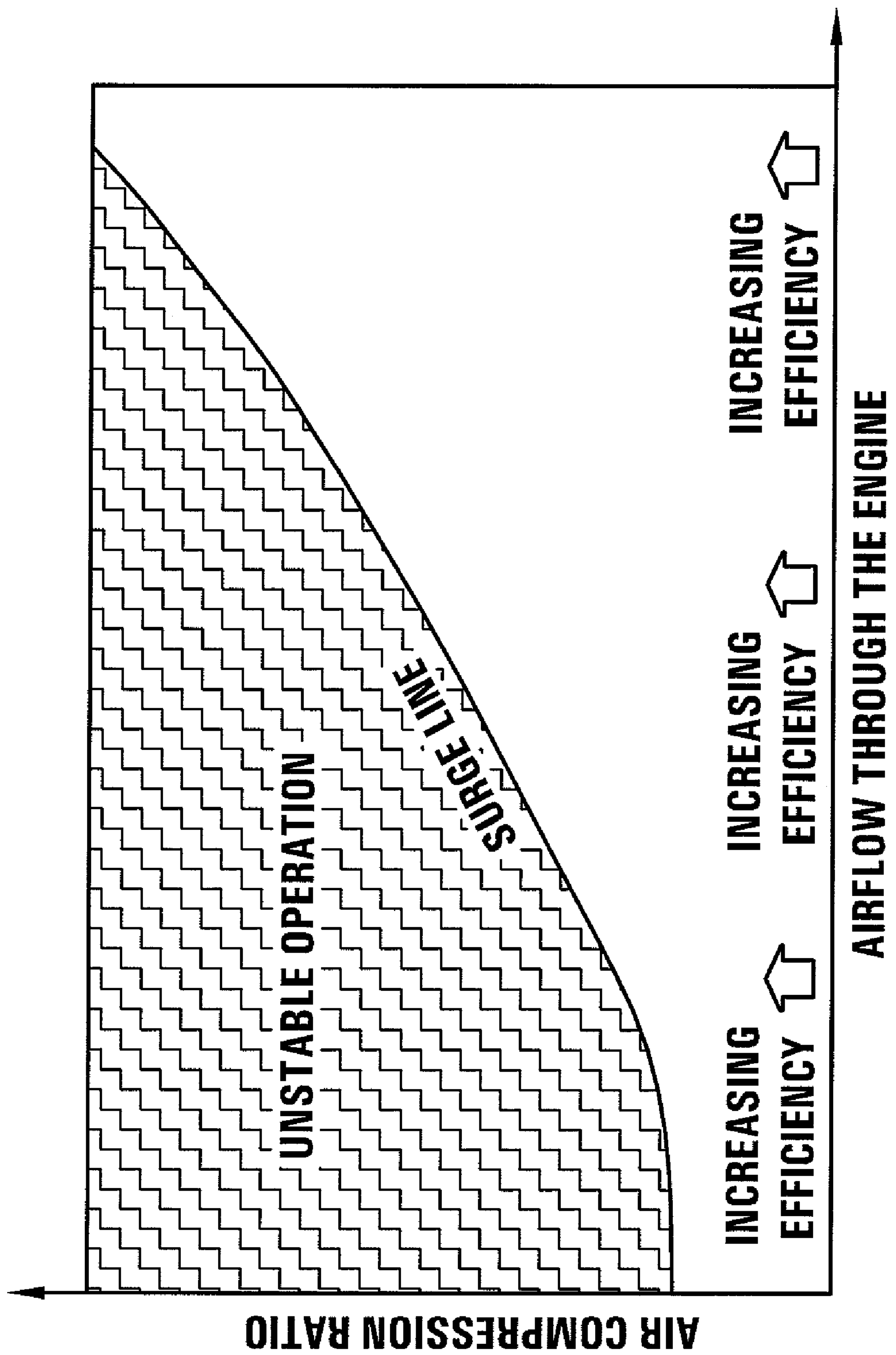
FIG. 3 shows a graph depicting the relationship between fuel consumption, unstable operation of the turbine engine, surge lines, and air compression ratios.
Figure 4:
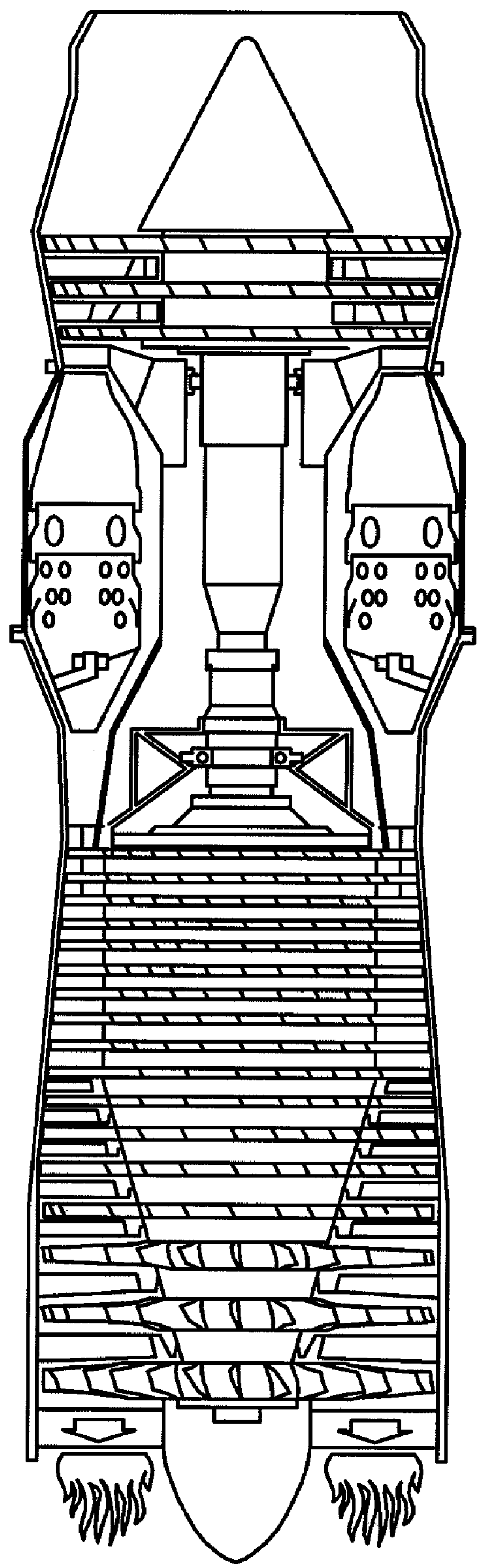
FIG. 4 shows a reversal in the direction of gas flow toward the inlet of a turbine engine.
Figure 5:
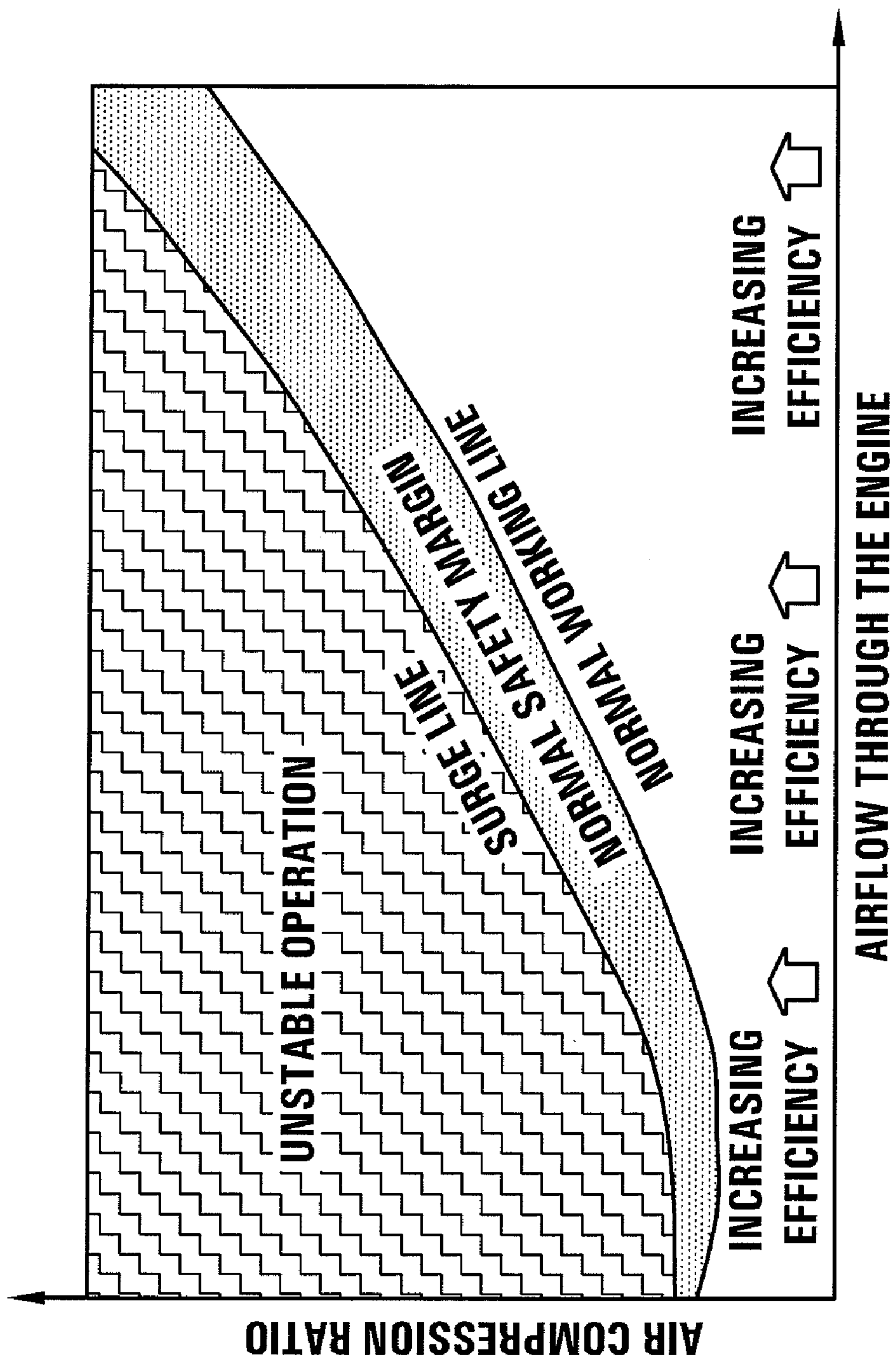
FIG. 5 shows a graph depicting the relationship between fuel consumption, unstable operation of the turbine engine, surge lines, normal safety margins and air compression ratios.

Referring now to the drawings wherein the showings are for purposes of illustrating the embodiments of the invention only and not for purposes of limiting the same, FIG. 1 shows a compressor in an axial-flow turbojet engine according to one embodiment. However, the principles and invention described in this document apply to all types of turbine engines including, without limitation, turbofan and turboprop engines and the like as well as any form of rotating compressor. For example, according to one embodiment, active surge control may be applied to a centrifugal compressor such as that which is used in the chemical industry. In another embodiment, intake throttling may be used to maximize centrifugal-compressor efficiency. Accordingly, active surge control may be used to move a compressor's butterfly valve or guide vanes.

According to one embodiment, the temperature sensing elements may be fiber Bragg gratings (FBGs). However, the scope of this invention is not limited to the use of FBGs as temperature sensing elements. For example, one of skill in the art will realize that other sensing elements can also be appropriate including, without limitation, intrinsic and extrinsic Fabry-Perot fiber-optic sensing elements and the like; and electronic detectors including fine-gauge thermocouples, thermistors, resistance thermometer detectors (RTDs), and the like.

Figure 6B:
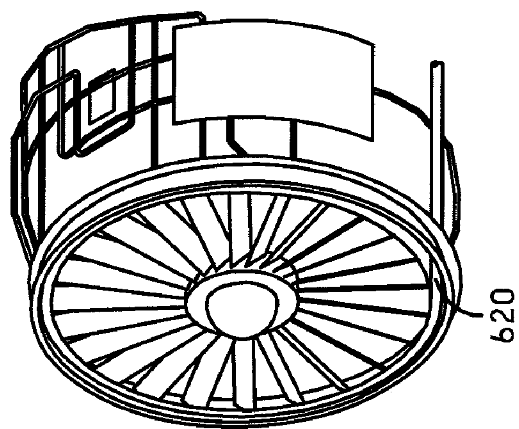
FIG. 6B is a view of the embodiment of FIG. 6A where the sensing element array is shown in the installed position.
Figure 6A:
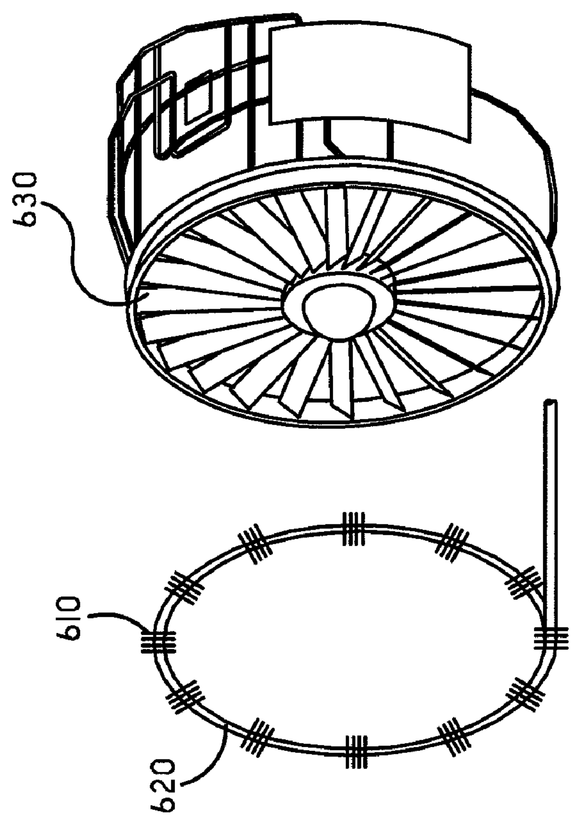
FIG. 6A is an exploded view, including an exaggerated tube width, showing the placement of a sensing element array upstream of a turbine engine inlet according to one embodiment.

With reference now to FIGS. 6A and 6B, according to one embodiment, temperature sensing elements 610 can be formed into an array 620 and installed, for instance, near the inlet 630 of a gas turbine engine. In some embodiments the sensing elements can detect positive pre-surge temperature spikes while withstanding and negligibly interfering with the high velocity inlet air stream. In some embodiments, temperature sensor array 620 may be located at one or more alternative positions in the pre-combustor flow path instead of, or in addition to, temperature sensor arrays 620 at the turbine-engine inlet 630. For example, temperature sensor arrays may be placed at one or more locations between individual compressor stages. Such embodiments may enhance temperature-spike detection, because pre-surge conditions may be detectable in front of one compressor stage before being detectable in front of other compressor stages. Furthermore, some engine designs may be better suited to a sensor array disposed in one or more alternative positions.

With continued reference to FIG. 6, in still other embodiments of the invention, one or more temperature sensor arrays may be placed downstream of the combustor. For example, temperature sensors can be placed in the turbine or exhaust stream thereby enabling detection of negative temperature spikes occurring as pre-surge instabilities cause rapid dips in post-combustor gas flow. In yet another embodiment, one or more temperature sensor arrays may be placed in or near the combustor to detect pre-surge combustion temperature spikes. Conditions in the combustor require very-high temperature sensors, such as sapphire-based Fiber Bragg Gratings (FBGs) or Fabry-Perot sensors, infrared optical sensors, silicon carbide-based sensors, or platinum-rhodium (e.g. type S) thermocouples.

Figure 7:
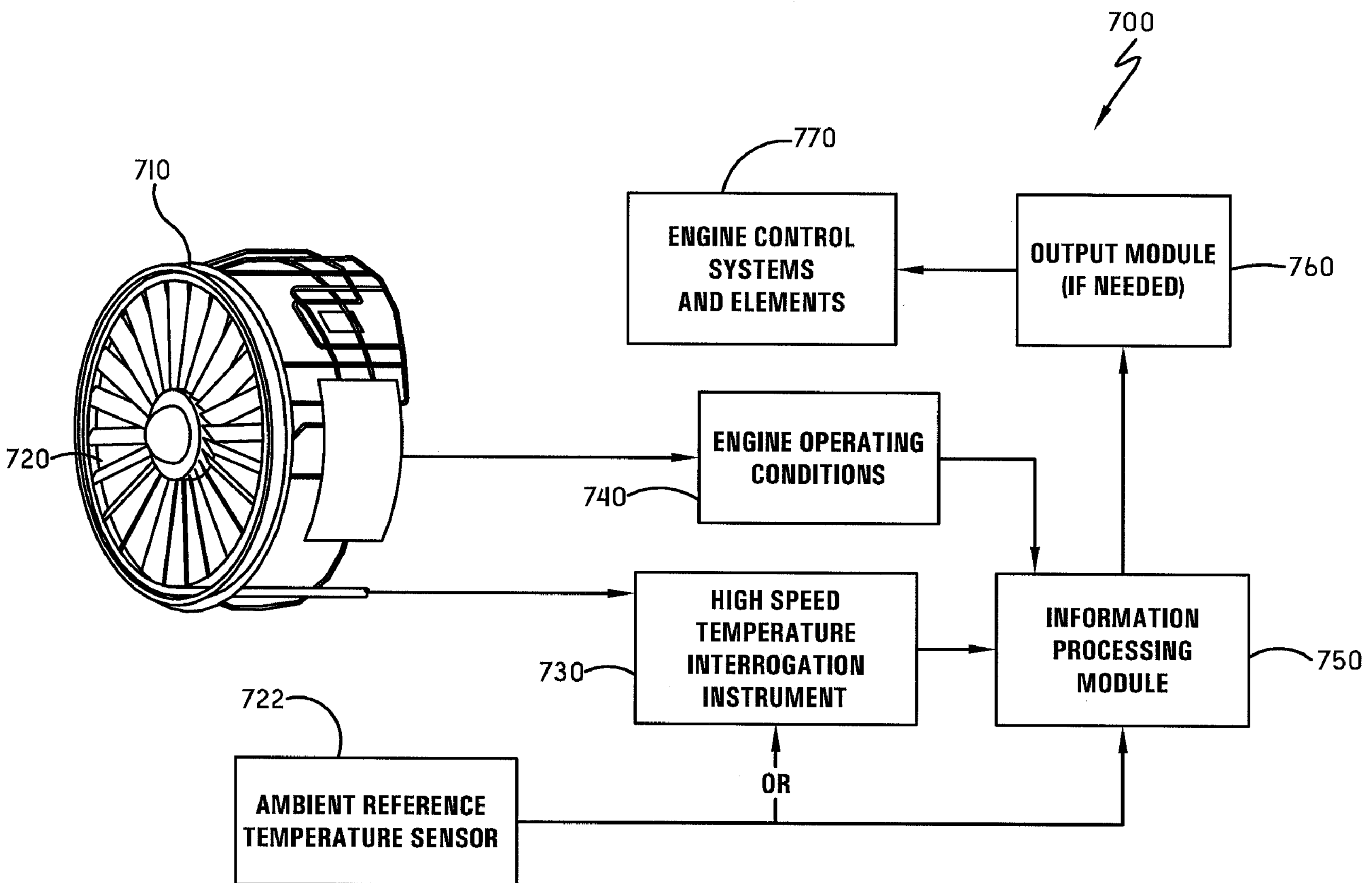
FIG. 7 is a partial diagram-schematic view showing a configuration of the active surge control system according to one embodiment.

With reference now to FIG. 7, the control of compression ratios to just below a surge line, according to one embodiment, will generally be described. A high-speed temperature interrogation instrument 730 is in electronic data communication with an information processing module 750, such as a computer or programmable logic controller. In some embodiments the information processing module 750 may store one or more databases 740. For instance in some embodiments the module 750 may contain surge line and/or pre-surge condition data and/or data characteristic of transitional phase between non-surge and full surge conditions. Furthermore, the data may control for a wide variety of operating condition variables such as air inlet temperature. Still further, such data may be empirically determined, and/or calculated by one or more mathematical models known to those of skill in the art. In some embodiments the data enhance surge-detection sensitivity by enabling the processing module 750 to look for surge indicators and respond to time-dependent surge patterns.

With continued reference to FIG. 7, according to one embodiment, the information processing module 750 may continuously monitor the temperatures that are detected by the sensor-element array 720 and temperature interrogation instrument 730. Further, the information processing module 750 may continuously monitor an ambient-air reference temperature sensor 722. The ambient-air reference temperature (s) may be measured near, but not in front of, the turbine engine air inlet 710. The ambient-air temperature(s) may be independent of any pre-surge temperature spikes or actual surges. The information processing module 750 may also continuously monitor the differences between the inlet temperatures and the reference ambient temperature(s) so as to differentiate between normal ambient temperature fluctuations and pre-surge temperature spikes or surges. The information processing module 750 may also continuously monitor the key engine operating conditions, including airflow(s) through the engine.

With continued reference to FIG. 7, according to one embodiment, the information processing module 750 may continuously analyze temperature differences as described above, and may also analyze engine operating conditions relative to stored pre-surge and surge conditions. When the information processing module 750 detects pre-surge temperature spikes or actual surges the processor commands one or more of the following controls 770 to modify the airflow and/or compression ratio and thereby get compressor operation below the surge line. The information processing module 750 may command the inlet-vane/ported-shroud inlet air controls 770, other bleed-air controls 770, the fuel controls 770, and/or the butterfly valve 770. If necessary, the information-processing module 750 may implement the above commands through an analog or digital output module 760.

Either existing or novel control elements may actuate the control. As an example of the latter, according to one embodiment, the control element may comprise an active surge control in centrifugal compressor with ported shroud as described below.

Figure 8:
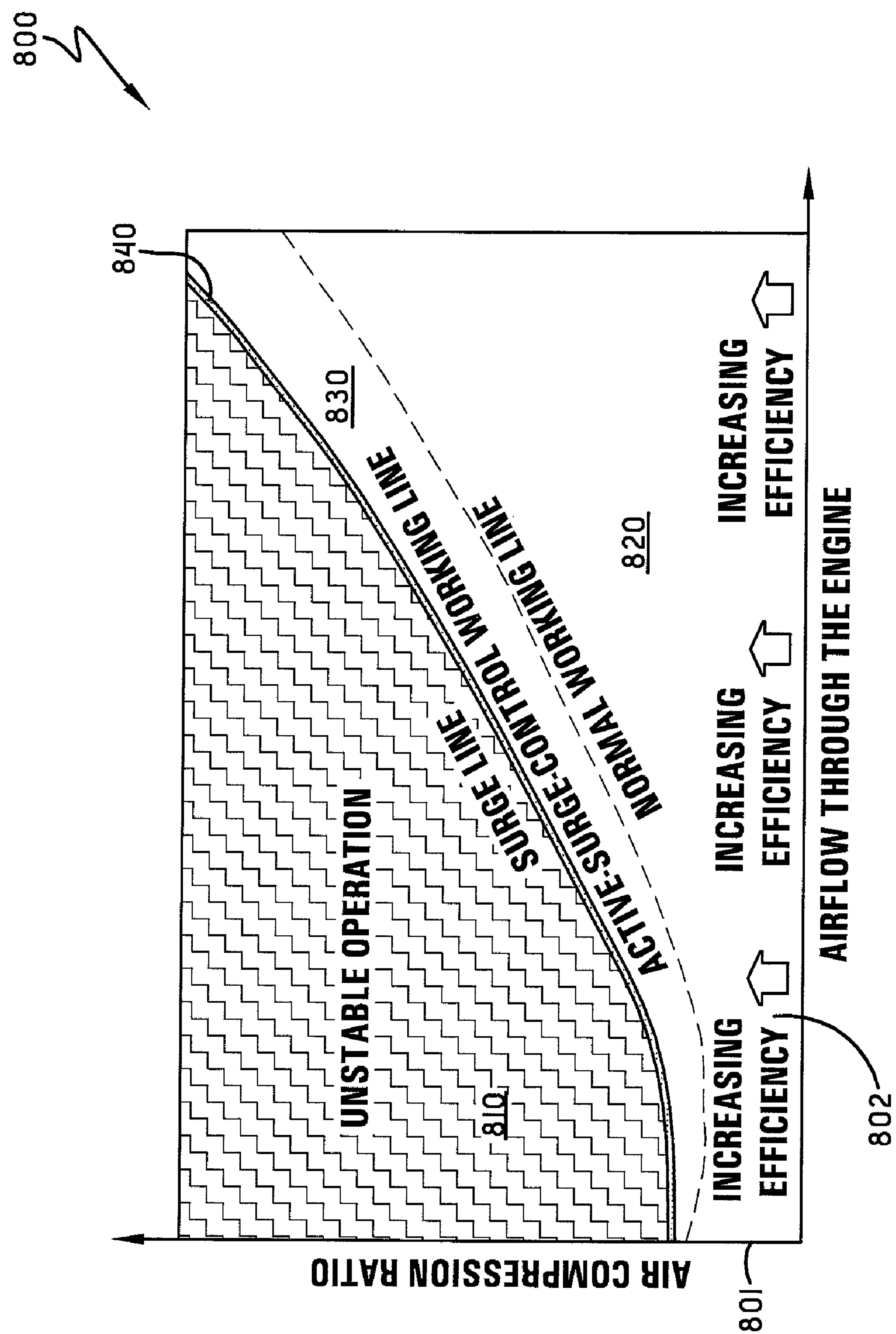
FIG. 8 shows a graph showing optimized working air compression ratios maintained according to one embodiment.

With continued reference to FIG. 7, as indicated previously, other embodiments of the invention may utilize one or more temperature sensor arrays 720 at other locations in the engine's gas flow path, instead of or in addition to a temperature sensor array at the engine inlet 760. In such embodiments, the information processing module 750 may monitor and analyze signals from all such temperature-sensor arrays and modify engine operation accordingly. When the engine includes more than one pre-surge temperature-sensor array, the information processing module 750 may be designed to control engine operation based on the first-detected and/or most dominant pre-surge temperature spikes. In such an embodiment, the information processing module 750 decides which set of temperature-array signals are optimal for engine control. The information processing module 750 may then utilize the signals and can cease further analysis and usage of the other temperature-array signals. In another embodiment, the information processing module 750 may control the engine settings based on a matrix of pre-surge temperature-spike signals from all installed temperature-sensor arrays. In yet another embodiment, the information processing module may control engine operation based on automatic selection of one of the above two modes, in response to an information processing module 750 decision on which mode is necessary or optimal. As a result, the air compression ratio is maintained at a value that optimizes engine efficiency as shown in FIG. 8. Further, blade/impeller clearances in the compressor can now be closer than normal.

With reference now to FIGS. 1-8, according to one embodiment, the closer than normal blade/impeller clearances in the compressor may further improve efficiency. Normally, the clearances between the rotating and stationary parts of compressors (hereafter, referred to as rotors and stators, respectively) must allow for surges because the high temperatures generated by surges can cause sudden, uneven thermal expansion in these parts. Normally, rotor-to-stator clearances must be open enough to prevent potentially damaging physical contact during a surge event. With active surge control, the engine should not experience full surges, but merely harmless pre-surges. Because pre-surges cause minimal thermal expansion in the compressor, rotor-to-stator clearances can be tighter. Tighter rotor-to-stator clearances result in less bypass of air around the tips of blades/impellers and therefore higher compressor efficiency.

Figure 13B:
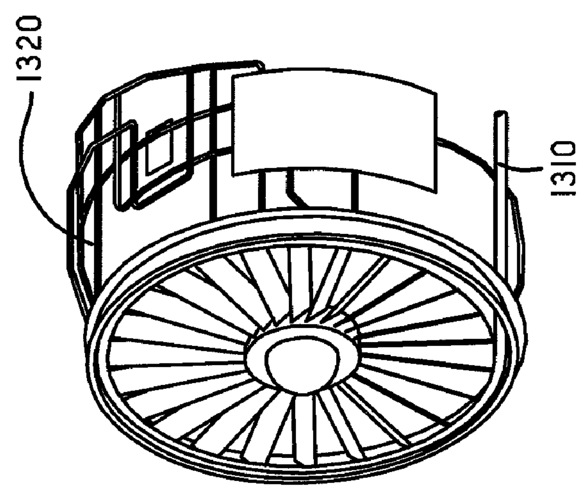
FIG. 13B is a non-exploded view of the embodiment of FIG. 13A showing the array in an installed position.
Figure 13A:
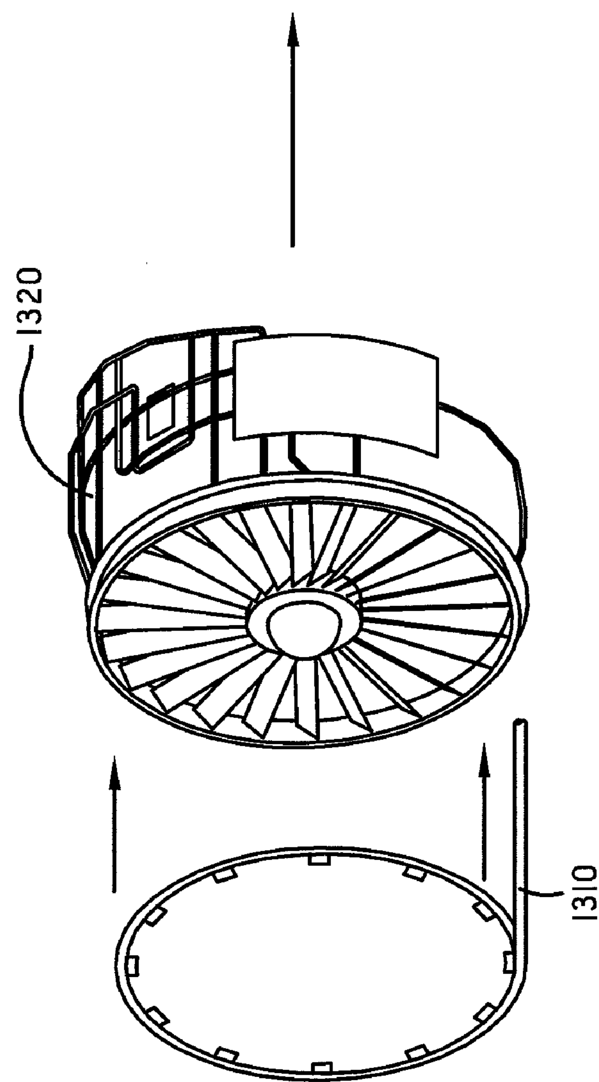
FIG. 13A is an exploded view of a turbine engine showing an array of pressure sensors or microphones and a turbine engine.

With continued reference to FIG. 13, in other embodiments of the invention, pressure sensors and/or microphones 1310 may be located at one or more other positions in the pre-combustor flow path instead of, or in addition to, pressure sensors and/or microphones at the turbine-engine inlet. For example, pressure sensors and/or microphones may be placed at one or more locations between individual compressor stages. Such embodiments allow pressure-spike detection and/or sound-pattern-change detection and/or sound-spike detection to be enhanced because pre-surge conditions may begin at, and be detectable in front of, one compressor stage before being detectable in front of other compressor stages. Such embodiments also allow the invention to be optimized for individual engine models.

With continued reference to FIG. 13, in still other embodiments of the invention, pressure sensors and/or microphones 1310 may be placed downstream of the combustor, for example, in or connected to the turbine or exhaust stream so as to detect the negative temperature spikes that occur as pre-surge instabilities cause rapid dips in post-combustor gas-flows. According to some embodiments such sensors can be partially isolated from high temperatures, for instance, by mounting the sensors at the ends of short connecting tubes and/or behind secondary diaphragms and/or with cooling provisions. In yet another embodiment, pressure sensors or microphones may connect to or be placed near the combustor to detect pre-surge combustion temperature spikes.

Figure 14:
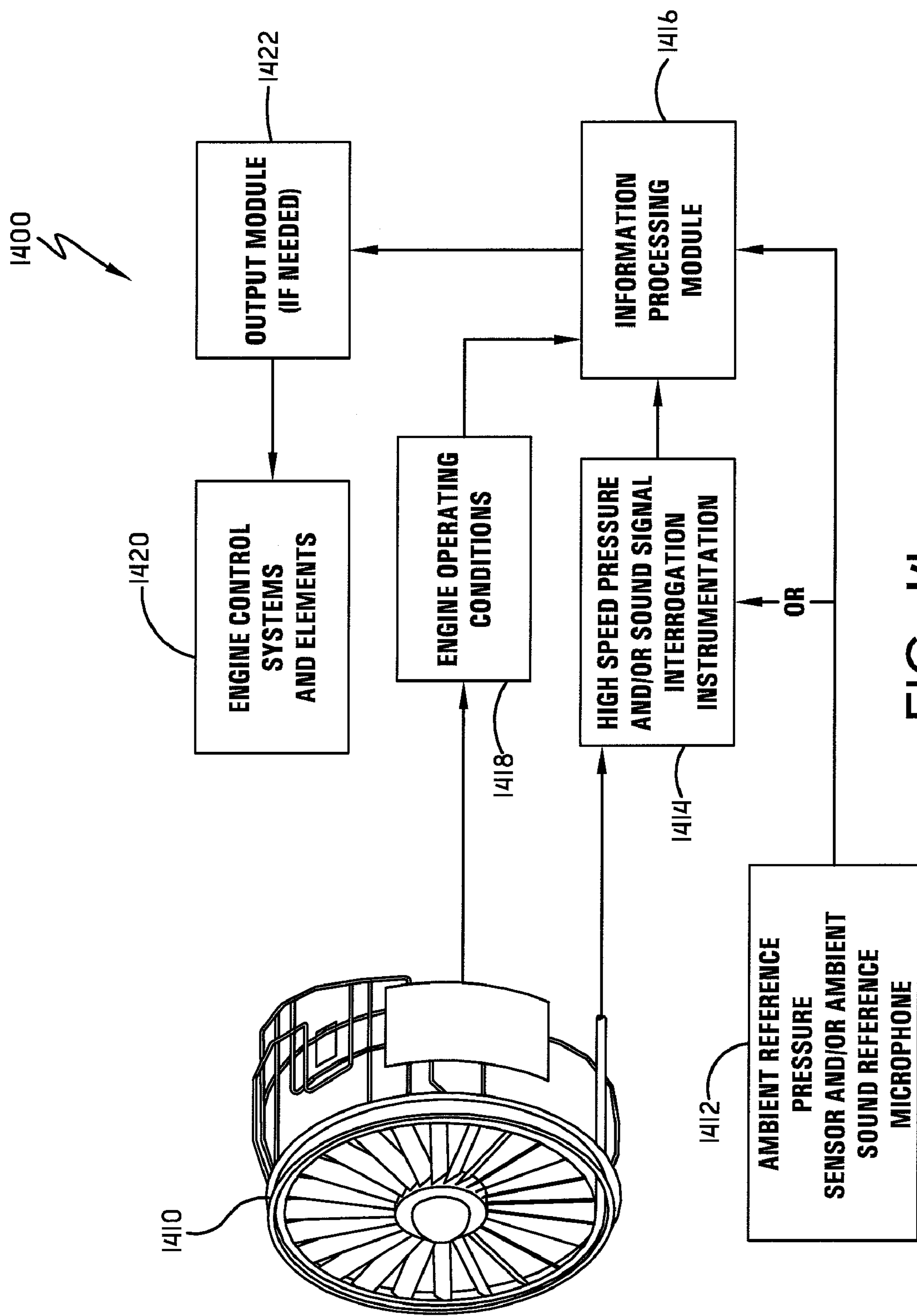
FIG. 14 is a schematic view of an active-surge-control system for a turbine engine according to one embodiment.

With reference now to FIG. 14, active surge control based on detection of pre-surge pressure spikes and/or sound-pattern-changes and/or sound spikes will generally be described. Pre-surge conditions in a turbine engine result in abnormal pressure fluctuations in the gas phase. Some of such pressure fluctuations can be fast enough to be detected as abnormal sound patterns and/or sound spikes. The invention detects the pre-surge pressure spikes and/or sound-pattern changes and/or sound spikes with one or more fast-response pressure sensors and/or acoustic pressure sensors or microphones or arrays of such sensors 1410. The pre-surge pressure spikes and/or sound pattern changes and/or sound spikes may be a low-millisecond response or sub-millisecond-response. For example, a currently available acoustic fiber-optic pressure sensor (FISO Model FOP-MA) can detect pressure changes as small as 0.0075 psi at rates as fast as 30 kHz, and resists electromagnetic interference (EMI).

Additionally, the pre-surge pressure spikes and/or sound pattern changes and/or sound spikes may be a low-millisecond-response or sub-millisecond-response as detected by electronic pressure sensors or microphones. According to some embodiments these pressure sensors and/or microphones can operate at the temperature extremes encountered in or near the gas flow paths to be monitored and therefore can be mounted directly next to or in these flow paths. Alternatively, lower-temperature pressure sensors and/or microphones can be partially isolated from the gas-flow-path temperature extremes, for example, by mounting them at the ends of short connecting tubes and/or behind secondary diaphragms and/or with cooling provisions. In one embodiment, the pressure sensors and/or microphones would be secured around the periphery of the engine's air inlet so as to detect positive pre-surge pressure spikes and/or abnormal sound pattern changes or sound spikes while withstanding and negligibly interfering with the high velocity inlet air stream.

With reference now to FIG. 14, control of engine compression ratios to just below surge line based on detection of pre-surge pressure-spikes and/or sound-pattern-changes and/or sound spikes will generally be described. The high-speed pressure and/or sound instrumentation may connect to an information-processing module such as a computer or programmable logic controller. The information-processing module may store an array of known and/or computer-modeled surge-line and pre-surge-condition information—covering use of the monitored turbine engine under all specified ambient operating conditions. The information-processing module also may include empirically determined and stored digital signatures of any or all of the following at various operating conditions: inlet pressure changes; engine sound patterns; and sound intensities at particular frequency bands. Information relating to the sound intensities at particular frequency bands may include situations that start with initial detection of pre-surge events and end with detection of full surge events. Such signatures will potentially enhance surge-detection sensitivity by enabling the processing module to look for and respond to time-dependent surge patterns. The information-processing module may continuously monitor the pressures and/or sounds that are measured by the sensors and/or microphones, interrogation instrumentation and the ambient reference pressures and/or sounds that are measured near to but not in front of the turbine engine air inlet, and key engine operating conditions including airflow(s) through the engine. The interrogation instrumentation and the ambient reference pressures and/or sounds may be measured, to the extent reasonably possible, in such a way as to substantially isolate the reference measurements from any pre-surge or surge conditions.

With continued reference to FIG. 14, the information-processing module may continuously analyze the differences between the inlet and reference pressures and/or inlet and reference sound intensities and/or inlet and reference sound patterns. The differences between the inlet and reference pressures and/or inlet and reference sound intensities and/or inlet and reference sound patterns may be analyzed to differentiate between the normal ambient pressures and/or sound intensities and/or sound patterns; and, the pre-surge (and surge) pressures and/or sound intensities and/or sound patterns. In the case of sound intensities and patterns the information processing module may be programmed to determine differences between the instantaneously measured pressures and/or sound intensities and/or sound patterns at the engine inlet; and, the memory-stored, very recently measured pressures and/or sound intensities at the reference locations (e.g. measured a few seconds or a few minutes earlier). Such an approach may yield reasonable differences between engine inlet conditions and reference conditions and yet avoid potential pitfalls of trying to isolate instantaneous reference measurements from instantaneous engine-inlet measurements.

With continued reference to FIG. 14, additionally or alternatively, the information processing module may continuously analyze the monitored information and engine operating conditions relative to stored pre-surge and surge condition. In one embodiment, the information processing module may compare engine-inlet sound patterns and/or lower-frequency pressure-patterns with the corresponding reference patterns and/or pre-stored patterns by first converting these patterns into sound-intensity vs. frequency spectra, using a fast Fourier transform (FFT) software routine(s). The information processing module may then determine the differences between these spectra, by subtracting them from each other. Finally, the information processing module may compare peaks and/or valleys in the resulting spectra to the array of known and/or computer-modeled surge-line and pre-surge-condition information, thereby revealing pre-surge and surge conditions. According to some embodiments, when the information processing module detects pre-surge conditions or actual surges it commands controls to modify the airflow and/or compression ratio and thereby get compressor operation below but close to the surge line. The information processing module may command the inlet-vane/ported-shroud inlet air controls, other bleed-air controls, fuel controls, or the butterfly valve. If necessary, the information-processing module may implement the above commands through an analog or digital output module.

With continued reference to FIG. 14, either existing or novel control elements may actuate the control commanded by the information processing module. As an example of the latter, this invention includes the novel control element described below in the general description of active surge control in centrifugal compressor with ported shroud. As indicated previously, other embodiments of the invention may utilize one or more pressure sensors and/or microphones at other locations in the engine's gas flow path, instead of or in addition to pressure sensors and/or microphones at the engine inlet. In such embodiments, the information processing module will monitor and analyze signals from the installed sensing devices and modify engine settings accordingly. When the engine contains pressure sensors and/or microphones at more than one location in the engine gas-flow path, the information processing module can be designed to act in one of the following modes: to control the engine settings based on the first detected and/or most dominant pre-surge data; or to control the engine settings based on a matrix of pressure signals from all installed pressure sensors and/or microphones. In controlling the engine settings based on the first-detected and/or most dominant pre-surge data, the information processing module may decide—in each pre-surge instance—which set of sensor and/or microphone signals are optimal for engine control. The information processing module may then utilize these signals and—in this specific pre-surge instance—ceases further analysis and usage of the other sensor and/or microphone signals. The information processing module may control the engine settings based on automatic selection of one of the above two modes, in response to an information processing module decision on which mode is necessary or optimal.

With continued reference to FIG. 14, qualitatively, in one embodiment, the end results of pressure and/or sound-based active surge control will be similar to the results of temperature-spike-based control of compression ratios. Quantitatively, the results may differ. More sophisticated embodiments of the invention may utilize any or all of the measurement technologies described above. Combined measurement technologies will potentially enable fine tuning of active surge control and/or add valuable redundancy to the detection of pre-surge conditions. The examples described above illustrate active surge control based on pre-surge temperature-spike measurements at the engine air inlet. Active surge control based on any or all of the following measurements—whether at the engine inlet and/or at other engine flow path locations—would involve analogous approaches: temperature-spike measurements; pressure-spike measurements; sound-pattern measurements; and, sound-spike measurements.

With reference now to FIGS. 1-8, active surge control in a centrifugal compressor comprising a ported shroud, according to one embodiment, will generally be described. In a ported compressor without active surge control, for example in a centrifugal compressor, the passive opening/uncovering of bleed ports just downstream of the impeller inducer results in partial bypass of compressed air around the impeller. This proven technology results in two effects, one positive and one negative, the increase of the surge safety margin, and a net loss of engine efficiency. In a ported compressor with active surge control, by contrast, the active surge control invention illustrated below automatically opens bleed ports only upon detection of pre-surge conditions and then, only as much as necessary. This novel technology for surge control results in two effects, both positive, the automatic maintenance of operation below the surge line, and a net gain of engine efficiency.

Figure 9:
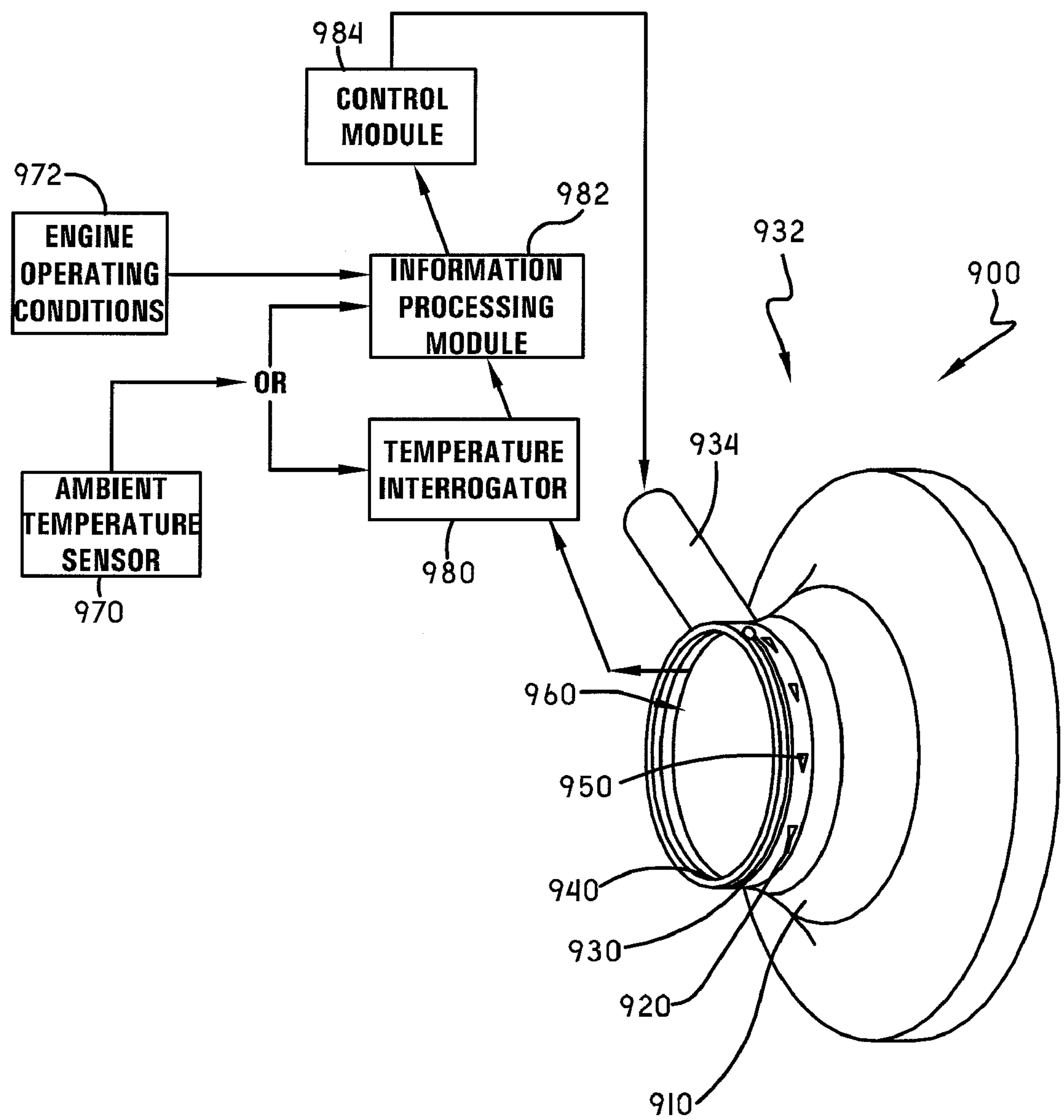
FIG. 9 is a perspective view of an embodiment that regulates bypass-air flow via an actuated slotted ring.

With reference now to FIG. 9, according to one embodiment, the invention regulates bypass-air flow via an actuated slotted ring. The actuated slotted ring may be mounted concentrically over the compressor shroud, just downstream of the impeller inducer and may be appropriately rotated—bi-directionally—via a mechanical actuator, such as a motor, hydraulic or pneumatic cylinder, solenoid, ratchet, or by any other means chosen with sound engineering judgment, in response to the onset or disappearance of pre-surge temperature conditions. The actuated slotted ring may variably cover the compressor's bleed ports as it rotates.

Figure 10:
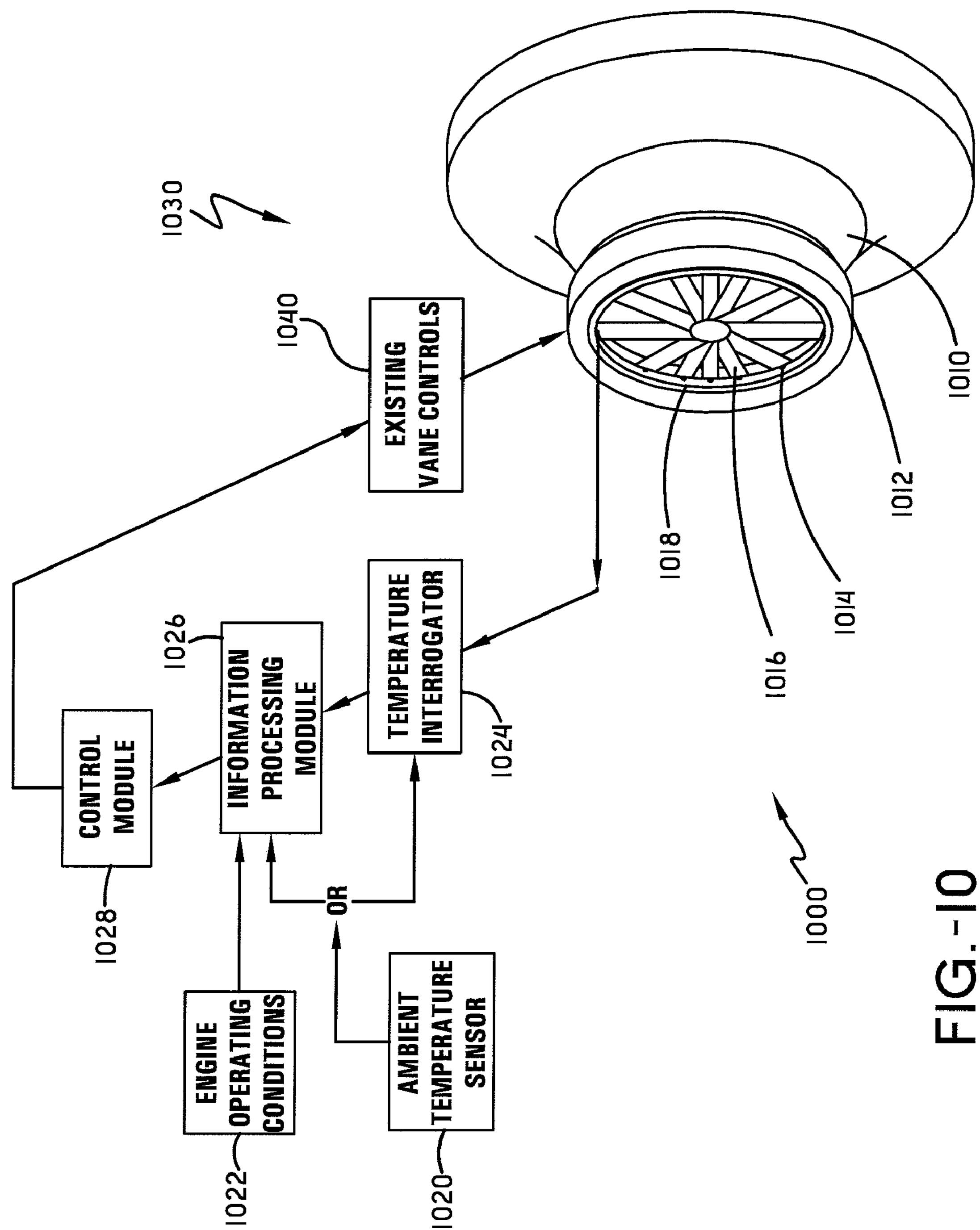
FIG. 10 is a perspective view illustrating the application of active surge control to a centrifugal compressor including variable-angle inlet guide vanes according to one embodiment.

With reference now to FIG. 10, according to one embodiment, the active surge control in centrifugal compressor with inlet guide vanes will generally be described. Some centrifugal compressors (as well as some axial compressors) contain variable-angle inlet guide vanes. These vanes are designed to provide 1) a desired swirl to the inlet air and 2) an adjustable pressure drop (throttling) across the inlet and therefore an adjustable surge safety margin. Varying of guide-vane angles adjusts safety margin more efficiently than opening and closing of bleed ports. Nonetheless, current methods of vane-angle adjustment result in conservative, sub-optimal surge safety margins and therefore sub-optimal engine efficiencies. By contrast, active surge control provides feedback adjustment of vane angles in response to pre-surge conditions, thereby resulting in the automatic maintenance of operation below the surge line and a net gain of engine efficiency.

With continued reference to FIG. 10, according to one embodiment, the active surge control of axial-flow compressor with inlet guide vane will generally be described. In some axial-flow compressors the angles of the guide vanes are adjustable. These vanes may be used as surge-control elements, in much the same way as for a centrifugal compressor with inlet guide vanes as described above and shown in FIG. 10. However, for an axial compressor, the active surge control system's information processor may in some cases output control signals for multiple sets of guide vanes.

Figure 11:
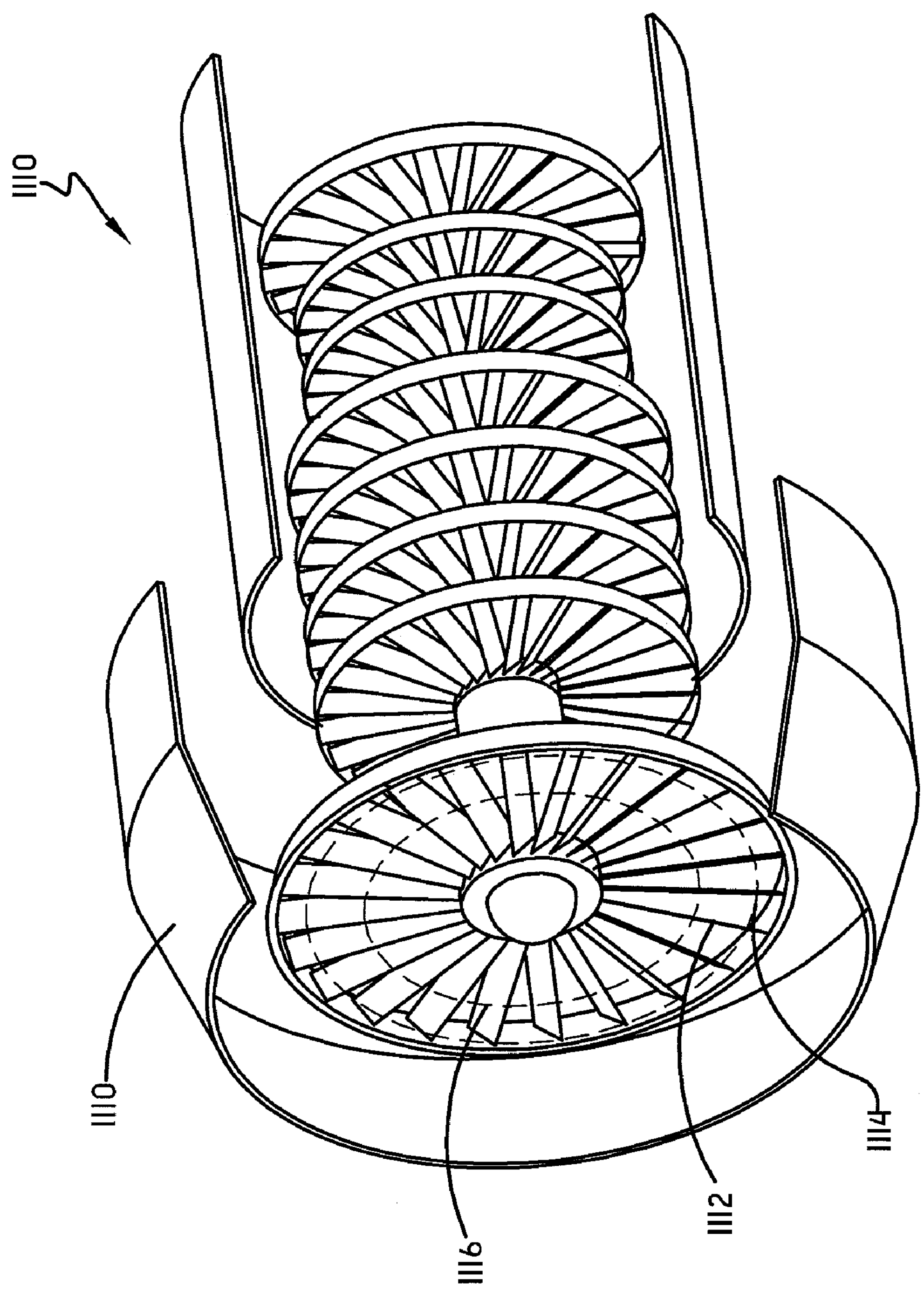
FIG. 11 is a perspective view of a turbofan engine according to one embodiment.

With reference now to FIG. 11, according to one embodiment, the active surge control for a turbofan engine will generally be described. In such an engine, the first compressor stage is a fan that is larger in diameter than the core of the engine. In non-military engines, frequently the fan is much larger in diameter than the core. The core is essentially a turbojet. Typically, much or most of the fan's output air gets bypassed around the core, and much or most of the engine's thrust results from the bypassed air. When most of the engine's thrust results from the bypassed air, the core's primary role is to power the fan, usually via a separate, low-pressure turbine on a separate concentric shaft. Because the bypass part of the fan (hereafter referred to as the bypass fan) is an air compressor, it too is subject to surges—reverse flows of hot air during instability. The bypass fan is subject to surges even though the temperature of bypass-fan-surge air exiting the engine inlet will typically be substantially lower than the temperature of core-surge air (but should still be detectable by a sensitive, millisecond-response sensor array). This results from the fan typically providing only one stage of compression. The surge line for the bypass fan looks substantially different than the surge line for the core. Active surge control of the bypass fan, in parallel with active surge control of the core, can optimize turbofan efficiency. That is, optimum efficiency of the turbofan engine occurs when both of the following operate as close to surge conditions as possible: the bypass fan and the core compressor.

Figure 12:
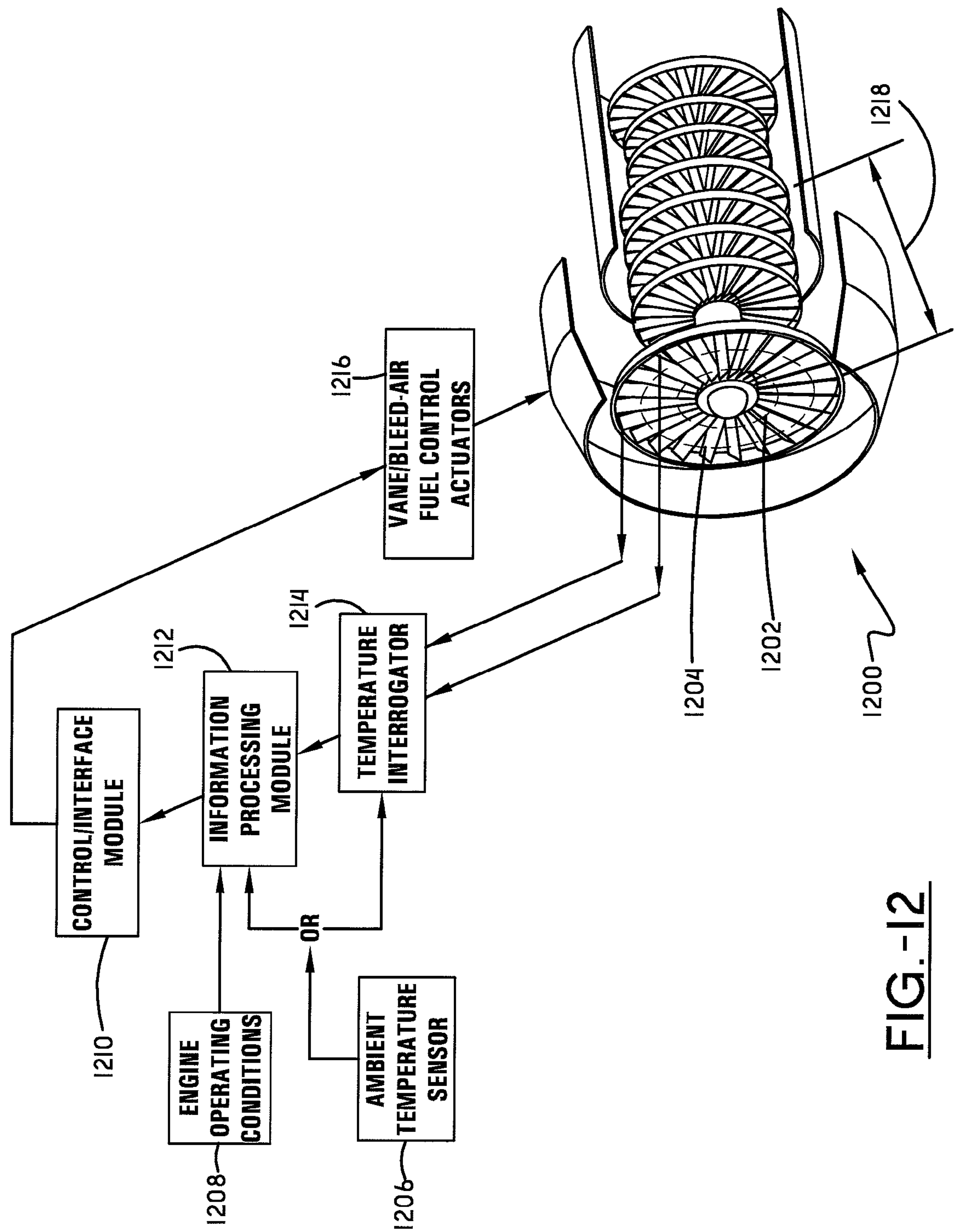
FIG. 12 is a schematic view of an active-surge-control system for a turbofan engine according to one embodiment.

With reference now to FIG. 12, one of the above two engine sections must of course take surge-control priority under a given set of conditions; both the core and the bypass fan cannot typically run simultaneously just below the surge line. Therefore, in one embodiment of this invention, the information-processing module of a turbofan engine active-surge-control system will, additionally, dynamically optimize core-control/fan-control priorities, based both on stored empirical data and monitored conditions.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A turbine engine control system, comprising:

at least one surge sensor adapted to detect surge events and adapted to be mounted in the air flow path of a turbine engine;

a high speed interrogation unit in electronic data communication with the at least one surge sensor and adapted to receive data from the surge sensor; and an information processing module in electronic data communication with the high speed interrogation unit and adapted to determine whether data obtained from the at least one surge sensor indicates a surge event or a pre-surge condition, and the information processing unit being in electronic controlling communication with one or more engine control elements, wherein the engine control elements are adapted to adjust the operation of the engine in response to data received from the information processing module and to maintain engine operation in a non-surge condition.

2. The system of claim 1, wherein the at least one surge sensor comprises an array of sensors.

3. The system of claim 1, wherein the at least one surge sensor is selected from one or more of a microphone, a thermocouple, a thermistor, a resistance thermometer, or an infrared detector.

4. The system of claim 3, wherein the infrared detector is selected from one or more of a fiber Bragg grating, an intrinsic Fabry-Perot fiber optic sensor, or an extrinsic Fabry-Perot fiber-optic sensor.

5. The system of claim 1, wherein the at least one surge sensor is disposed in a position selected from one or more of the turbine engine inlet, in the compressor section, upstream of the combustor, in the combustor, downstream of the combustor, in the low pressure turbine, or downstream of the low pressure turbine.

6. The system of claim 1, wherein the at least one surge sensor is thermally insulated and/or includes a cooling means.

7. The system of claim 1, wherein the at least one sensor is adapted to detect signal on a time scale resolution of about 1000 milliseconds to about 0.1 milliseconds.

8. The system of claim 1, wherein the at least one engine control element is adapted to control one or more of air flow rate, fuel injection flow rate, compressor speed, or compression ratio.

9. The system of claim 1, wherein the at least one engine control element comprises one or more of an inlet-vane, a ported-shroud inlet air control, a bleed-air control, a fuel control, or a butterfly valve.

10. The system of claim 1, further comprising at least one database in electronic data communication with the information processing module, wherein the database comprises engine operating characteristics indicative of surge, pre-surge and non-surge conditions.

11. The system of claim 10, wherein the operating characteristics comprise temperature and/or acoustic data.

12. The system of claim 10, wherein the information processing module is adapted to compare surge sensor data to data contained in the at least one database to determine the whether the engine is in a surge, pre-surge or non-surge state.

13. The system of claim 10, wherein the operating characteristics are empirically determined or determined by a mathematical model.

14. The system of claim 1, further comprising at least one reference sensor disposed outside of the flow path of the turbine engine, wherein the at least one reference sensor is in electronic communication with the high speed interrogation unit.

15. The system of claim 14, wherein data from the at least one reference sensor can be stored for comparison by the information processing module with data from the surge sensor.

16. The system of claim 14, wherein the system monitors engine operating characteristics continuously.

17. The system of claim 1, further comprising a control module in electronic data communication with the information processing module and in electronic controlling communication with at least one engine component, wherein the control module is adapted to adjust the operation of the at least one engine component in response to data received from the information processing module.

18. The system of claim 1, further comprising a bypass air flow regulating means adapted to variably cover a compressor bleed port.

* * * * *

UNITED STATES PATENT AND TRADEMARK OFFICE

CERTIFICATE OF CORRECTION

PATENT NO. : 8,342,793 B2
APPLICATION NO. : 12/196845
DATED : January 1, 2013
INVENTOR(S) : Donald R. Way and Joel Lantz It is certified that error appears in the above-identified patent and that said Letters Patent is hereby corrected as shown below:

Title Page, Item (75) Inventors, the correct spelling of the first inventor's name is Donald R. Way.

Signed and Sealed this
Twenty-second Day of October, 2013

Teresa Stanek Rea
*Deputy Director of the United States Patent and Trademark Office*